United States Patent [19]

Noble

[11] Patent Number: 4,467,962

[45] Date of Patent: * Aug. 28, 1984

[54] LAND IRRIGATION SYSTEM AND METHOD

[75] Inventor: Allen T. Noble, Boise, Id.

[73] Assignee: Noble Linear Irrigation, Inc., Boise, Id.

[*] Notice: The portion of the term of this patent subsequent to Jun. 23, 1998 has been disclaimed.

[21] Appl. No.: 417,037

[22] Filed: Sep. 13, 1982

Related U.S. Application Data

[63] Continuation of Ser. No. 275,273, Jun. 19, 1981, abandoned, which is a continuation of Ser. No. 80,060, Sep. 28, 1979, Pat. No. 4,274,584, which is a continuation-in-part of Ser. No. 887,792, Mar. 17, 1978, abandoned.

[51] Int. Cl.³ .................. A01G 25/09; F16L 27/08
[52] U.S. Cl. .................................. 239/1; 239/183; 239/711; 239/721; 285/5; 285/18
[58] Field of Search ................ 285/5, 18; 239/178, 239/183, 184, 709, 711, 721, 1

[56] References Cited

U.S. PATENT DOCUMENTS

| | | | |
|---|---|---|---|
| 3,729,016 | 4/1973 | Von Linslowe | 239/711 |
| 4,036,436 | 7/1977 | Standal | 239/183 |
| 4,159,080 | 6/1979 | Standal | 239/183 |
| 4,192,335 | 3/1980 | Standal | 239/183 |
| 4,274,584 | 6/1981 | Noble | 239/183 |

FOREIGN PATENT DOCUMENTS 2402916 7/1974 Fed. Rep. of Germany ...... 239/183

*Primary Examiner*—John J. Love
*Assistant Examiner*—Michael J. Forman
*Attorney, Agent, or Firm*—Arnold, White & Durkee

[57] ABSTRACT

A land irrigation system is illustrated in which an elongated sprinkler line continuously travels in a direction transverse to its length along the length dimension of a stationary water main and is continuously supplied with water from upstanding hydrants spaced along the length of the water main. Driven tractor means moves along the water main at substantially the same rate as the sprinkler line and supports one end of each of a pair of elongated water carrying pipe connector devices which extend outwardly from the tractor in generally opposite directions for automatic connection to and disconnection from successive hydrants along the main, the tractor supported ends being mounted for movement relative to one another on the tractor support to permit continuous movement of the tractor along the water main and intermittent, independent movement of the respective water carrying connecting pipes. Separate drive means are provided for the respective water carrying connecting pipes.

8 Claims, 17 Drawing Figures

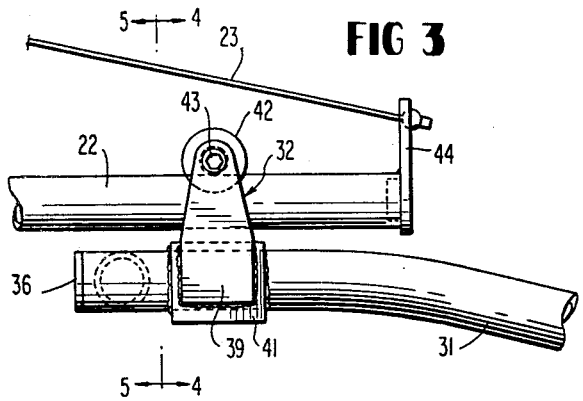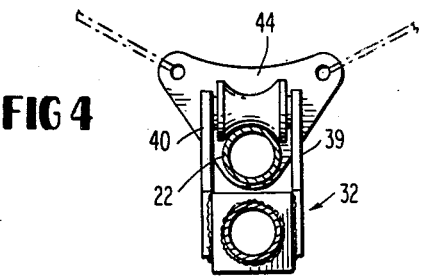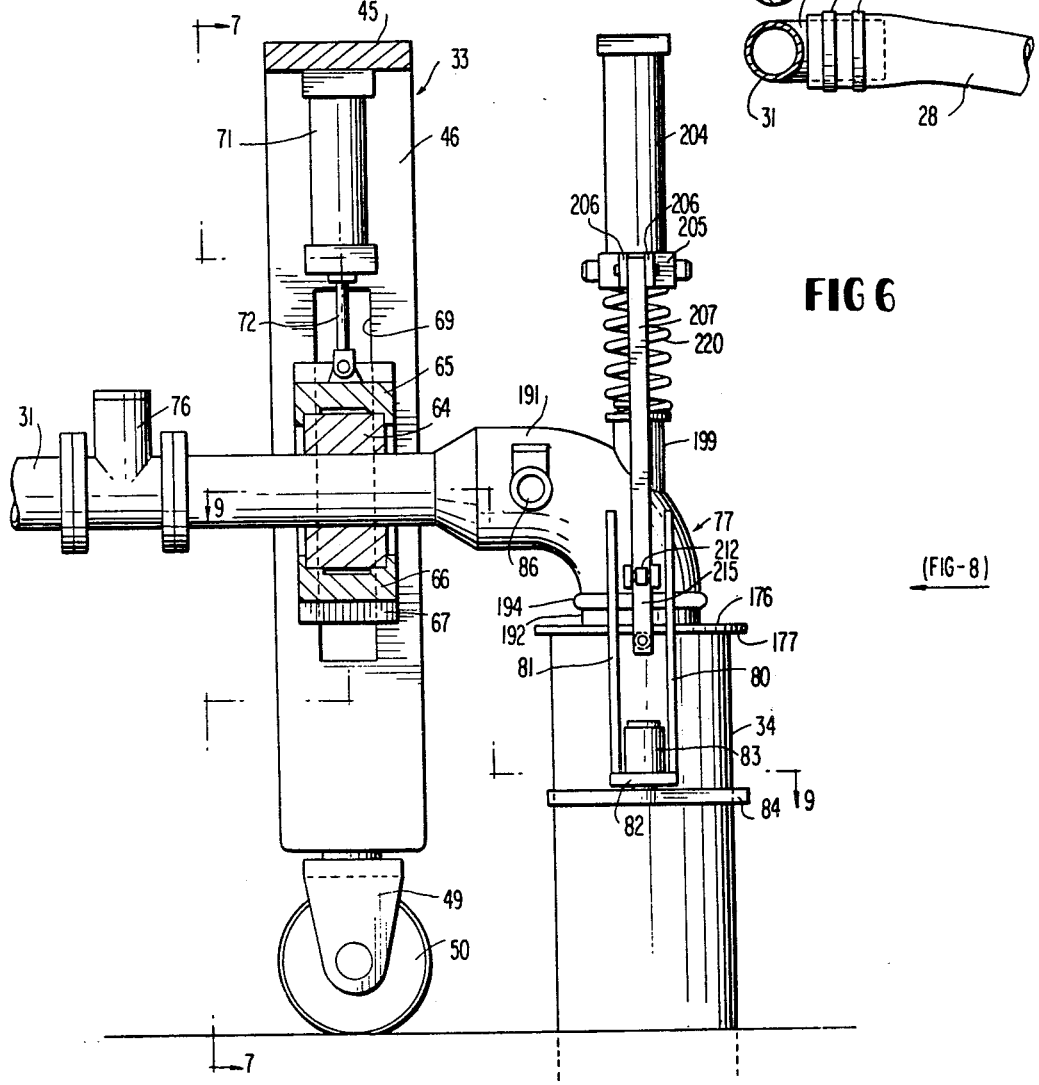

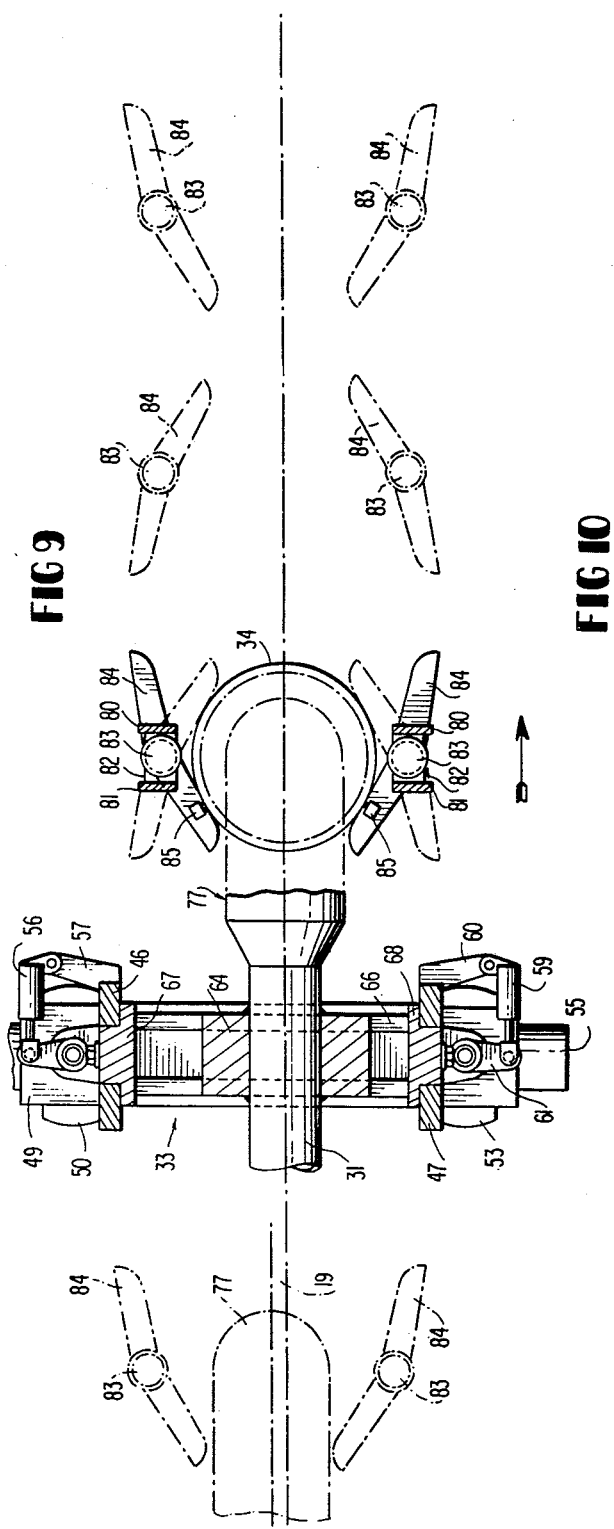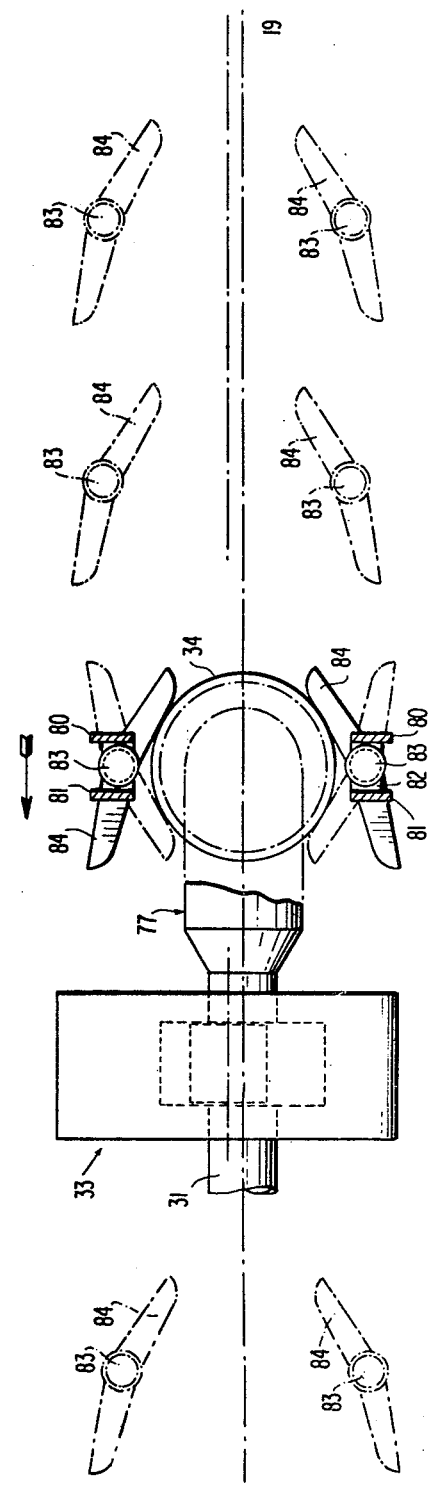

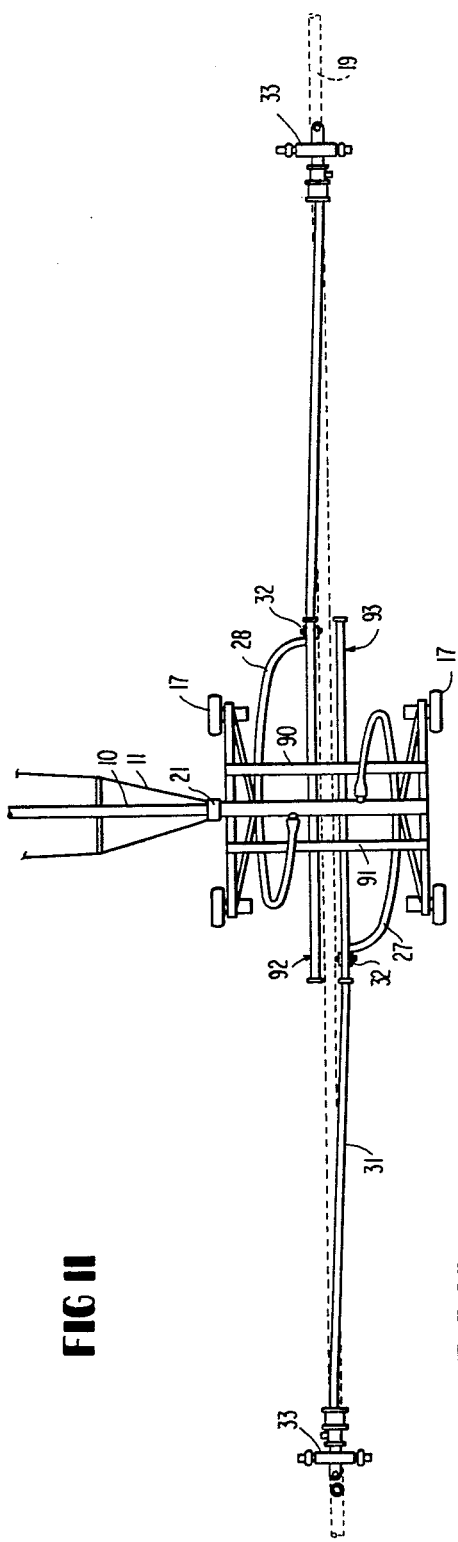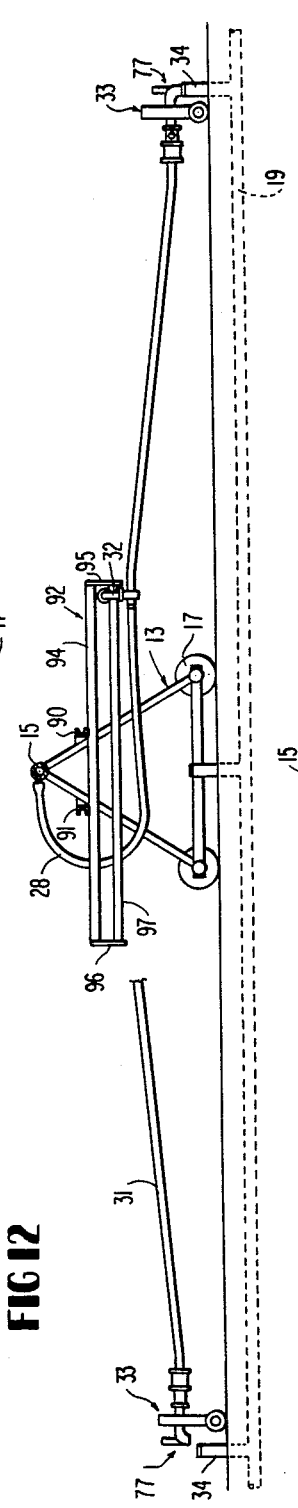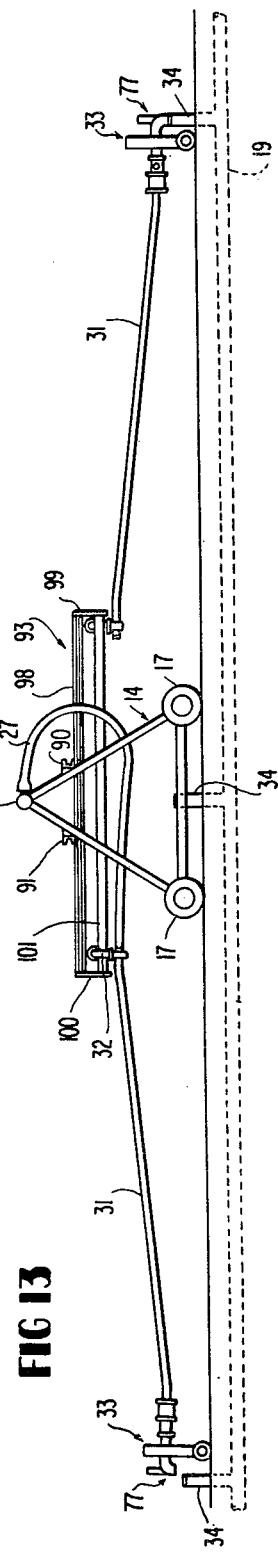

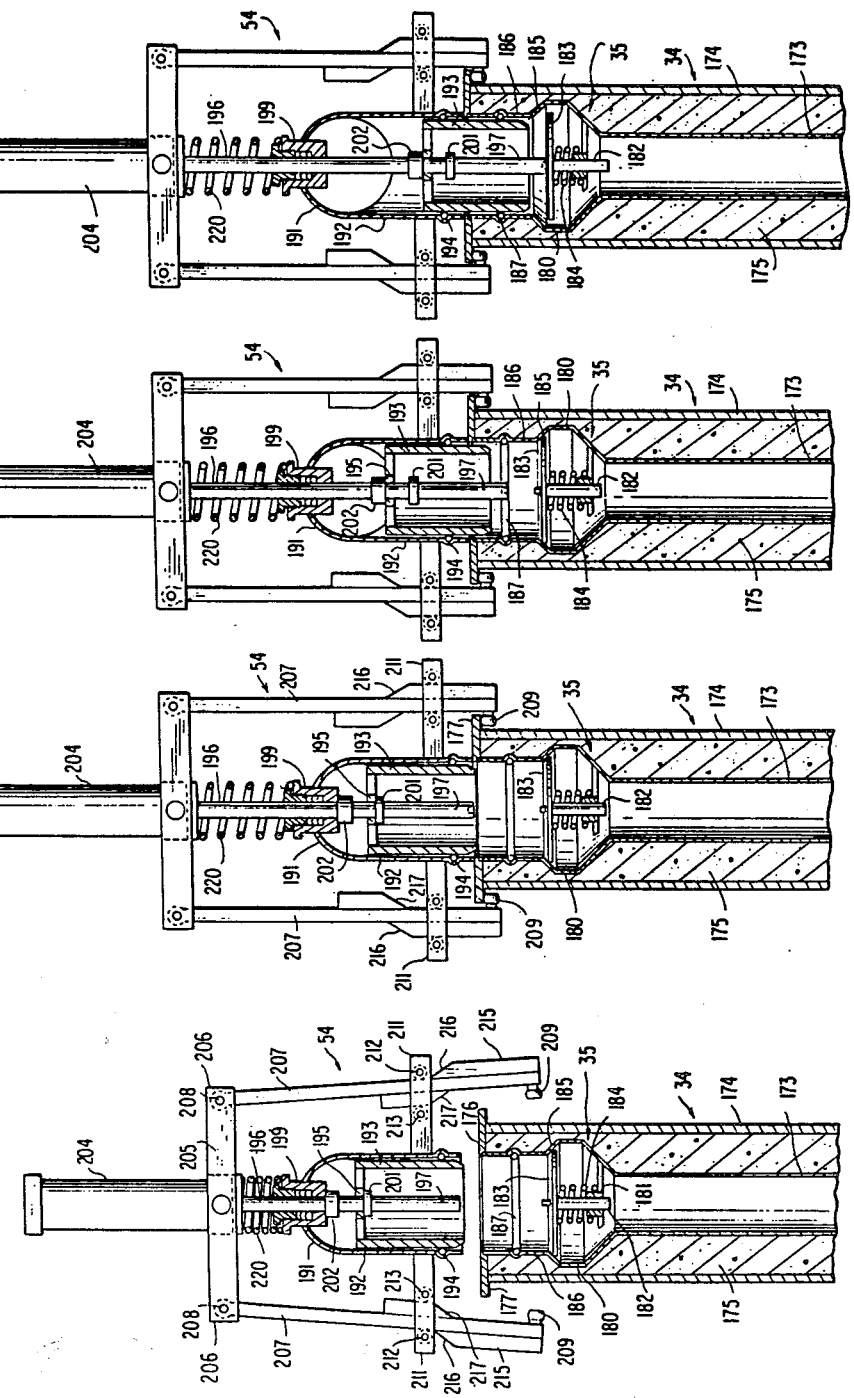

LAND IRRIGATION SYSTEM AND METHOD

BACKGROUND OF THE INVENTION

This is a continuation of application Ser. No. 275,273, filed June 19, 1981, now abandoned, which is a continuation of application Ser. No. 80,060, filed Sept. 28, 1979, now U.S. Pat. No. 4,274, 584, which is a continuation-in-part of my copending application Ser. No. 887,792 filed Mar. 17, 1978 now abandoned.

FIELD OF THE INVENTION

This invention is for use in connection with a land irrigating system in which a moving water sprinkler line having a water inlet at one point extends laterally to and moves along the length dimension of a stationary water supply main having a plurality of water outlet valves at equally spaced points along its length, and particularly involves an apparatus for successively connecting the water outlet valves of the stationary water supply main with water inlet means of the sprinkler line, the apparatus including a driven carriage for moving along the length dimension of the stationary water supply main at substantially the same overall rate of movement as the moving sprinkler line.

This invention is also for use in connection with a method of land irrigation wherein a moving sprinkler line having a water inlet at one point moves along the length of a stationary water supply main having water outlet valves at spaced intervals along the length thereof, the method involving successively connecting the water outlet valves of the stationary water supply main with water inlet means of the sprinkler line to obtain substantially continuous water supply to the sprinkler line.

DESCRIPTION OF THE PRIOR ART

When irrigating extensive areas of land, long sprinkler lines have been used for some time. Water has been supplied to these lines from buried pipes or mains having spaced risers projecting above the surface of the ground for connection to the sprinkler lines. Each time a sprinkler line had to be moved, manual labor was required for this purpose. This was a laborious and time consuming operation. As time went on, the sprinkler lines, which can reach a length of a quarter of a mile and more were fitted with wheels to make them easier to move. Eventually, power was supplied in one way or another to the wheeled lines to keep them moving slowly along the desired path parallel to the direction of the main line with flexible hoses extending between the water inlet end of the sprinkler lines and the riser to which the sprinkler line was connected. Since the mains can be eight or more inches in diameter and contain water under substantial pressure, the required size and strength of the flexible hoses become extremely burdensome in manual operation. Proposals were therefore made to facilitate connection of the sprinkling lines to successive risers with the least manual effort but to applicant's knowledge no successful machine has been developed prior to his. Examples of such proposals are illustrated in Engel U.S. Pat. No. 2,750,228, Stafford U.S. Pat. No. Re. 26,285 and Smith et al. U.S. Pat. Nos. 3,381,893 and 3,446,434. Such proposals provided for intermittent connection of the sprinkler line to the main line utilizing power assisted mechanical devices as the hoses or telescoping pipes were moved from riser to riser, with the sprinkler line continuing to move along at the desired rate.

In order to provide for a continual source of water to the sprinkler line Rogers U.S. Pat. No. 3,463,175 and Standal U.S. Pat. No. 4,036,436 and Russian Pat. No. 434,918 proposed systems in which one riser is always connected to the sprinkler line, this being accomplished by having pipe or hose connections to the sprinkler line connect with devices which span three risers. By the arrangement employed in the Rogers and Standal patents, the forward part of the device is disconnected from one riser and goes on to a second riser ahead of the first riser and on connection of the device with the second riser, the hindmost part of the device, which has been connected to a third riser which is behind the first riser in the main line, moves up to connect with the first riser. As far as known to the applicant, these proposals were never put into use. In addition to requiring closely spaced risers, the mechanical problems associated with these systems appear to have ruled out their commercial use.

In the Russian patent, an elongated horizontal pipe having water inlet valves at each end is pivotally mounted at its center by a downturned ell on the forward end of a second, forwardly projecting elongated horizontal pipe which, in turn, is pivotally mounted at its rear end by an upturned ell to a sprinkler line carried by a mobile carriage. The carriage moves along a water main so that when one of the inlet valves is connected to a hydrant, the doubly pivoted mounting permits the first pipe to swing in an arc around the hydrant to bring the other valve in position to be connected to a hydrant (apparently manually) before the first is disconnected. The entire water connecting means is, therefore, cantilevered forward of the carriage. Although the illustrated structure could be modifired so as to be theoretically operable, the inoperable structure illustrated suggests that this device also was never actually used.

Von Linsowe U.S. Pat. No. 3,729,016 discloses another irrigation system for continuously feeding water to a sprinkler line, but this system is extremely complicated and requires twin main lines since the twin coupling devices for connecting the sprinkler line to the main line cannot pass each other. This proposal appears to have the same history in practice as the Rogers and Standal systems.

SUMMARY OF THE INVENTION

The primary object of the present invention is to provide an economical and durable land irrigation system of the type employing an elongated sprinkler line movable transversely of its length along the length dimension of a water main and including means for connecting the sprinkler line to successive hydrants spaced along the water main to continuously maintain water pressure to the sprinkler line as it is moved through a field.

Another object is to provide such an irrigation system in which a movable conveyance means, hereinafter generally referred to as a tractor, is driven along the water main at substantially the same rate as the sprinkler line and includes a pair of hydrant connectors each connected to the sprinkler line and each being adapted to be automatically connected to and disconnected from each hydrant in succession along the water main with one of the connectors being connected to a hydrant at all times.

In the attainment of the foregoing and other objects and advantages, an important feature of the invention resides in providing a simple, reliable connector apparatus for maintaining a continuous water flow path from the water main to the moving sprinkler line and for moving the connector apparatus along the water main and successively connecting and disconnecting each of a pair of connectors to each of a plurality of substantially equally spaced hydrants along the water main, with the apparatus requiring a minimum of energy and maintenance. This is accomplished in a preferred embodiment of the invention in which a tractor is driven along the water main at the same rate as the sprinkler line and is guided along a controlled path relative to the main. Elongated track means is mounted on the tractor and extends in generally parallel upwardly spaced relation to the water main and a pair of elongated connector pipes each having one end portion supported on the track means for movement therealong. Conduit means such as a flexible hose or an articulated pipe assembly connects the inner, track supported ends of the connector pipes to the sprinkler line.

The connector pipes extend outwardly in opposite direction from the tractor and generally parallel to the water main and to the track means, and each has its outer end supported by a carriage or truck having driven ground engaging wheels for moving the connector pipes along the track means relative to one another and relative to the tractor. Each connector pipe has valve coupling means on its outer end for engaging and automatically connecting the pipe to valve means on the hydrants. The respective carriages are guided along a controlled path relative to the water main to initially position the outer end of the pipes relative to the hydrants, and power means carried on the carriages is operable to accurately locate the end of the connector pipes in position for automatic connection to the hydrants.

In the preferred embodiment of the apparatus briefly described above, the tractor is driven through the field at a substantially constant rate corresponding to the rate of movement of the sprinkler line. One of the connector pipes, for example the rearwardly projecting pipe has its outer end connected to a hydrant and will remain stationary as the tractor continues to move forward. At the same time, the forwardly extending connector pipe can be disconnected from its hydrant and driven forward at a rate greater than the rate of the tractor with its inner end rolling outwardly along the track until the outer end reaches and is connected to the next hydrant. This occurs prior to the rearwardly extending end of the track reaching the inner end of the first connector pipe. When the forwardly extending connector pipe is connected to a hydrant, the rearwardly extending pipe is disconnected and driven forward, again at a rate greater than the rate of the tractor, so that its outer end is in position to be connected to the next hydrant, in succession, prior to disconnecting the forwardly extending connector pipe from its hydrant. Thus, water pressure is maintained continuously through one of the connector pipes to the sprinkling line to provide an uninterrupted flow of water and to enable continuous movement of the sprinkler line for a more uniform application of water to the field.

BRIEF DESCRIPTION OF THE DRAWINGS

The foregoing and other features and advantages of the invention will become apparent from the detailed description contained hereinbelow, taken in conjunction with the drawings, in which:

FIG. 3 is an enlarged fragmentary view of a portion of the apparatus shown in FIG. 2;

FIG. 4 is a sectional view taken on line 4—4 of FIG. 3;

FIG. 5 is a fragmentary sectional view taken on line 5—5 of FIG. 3;

FIG. 6 is an enlarged fragmentary view, partially in section, of another component of the apparatus illustrated in FIG. 2;

FIG. 9 is a sectional view, taken on line 9—9 of FIG. 6, and schematically showing certain of the elements in alternate stages of operation upon movement of the apparatus in one direction;

FIG. 10 is a view similar to FIG. 9 and showing the position of the apparatus when moving in the opposite direction;

FIG. 11 is a top plan view similar to FIG. 1 and showing an alternate embodiment of the invention;

FIG. 12 is a sectional view, in elevation, taken along line 12—12 of FIG. 11;

FIG. 13 is a side elevation view of the apparatus shown in FIG. 11; and,

FIGS. 14A, 14B, 14C, and 14D are sectional views, taken along line 14—14 of FIG. 8, with certain parts omitted, and illustrating the apparatus in different stages of operation.

DESCRIPTION OF THE PREFERRED EMBODIMENTS

Figure 1:
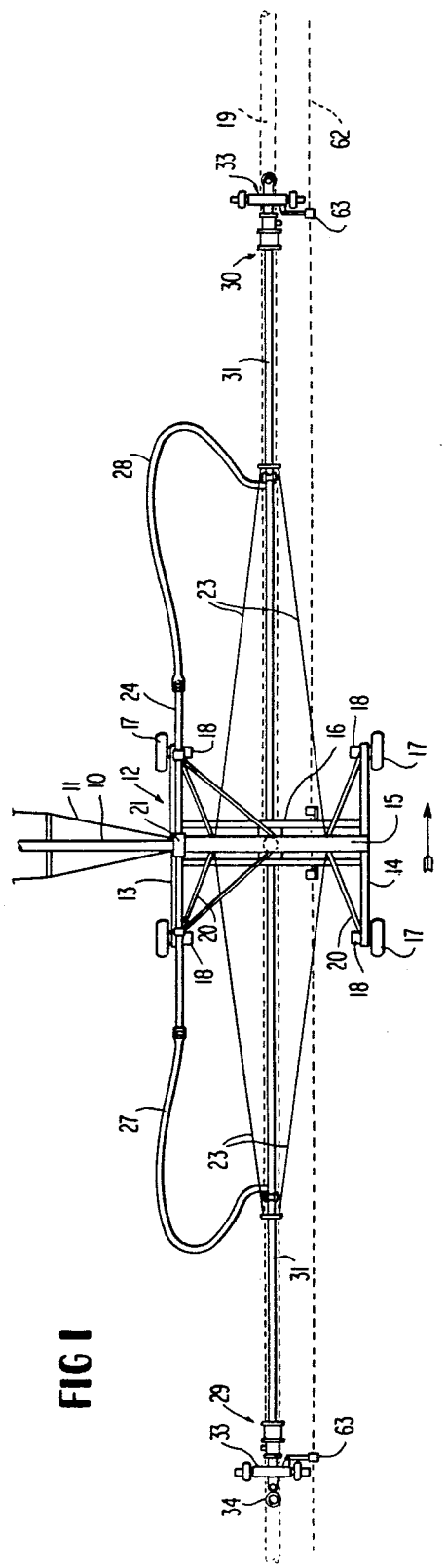
FIG. 1 is a top plan view of the connector apparatus of the present invention connected to a sprinkler line and with the subterranean water main and guide line being shown in broken line.
Figure 2:
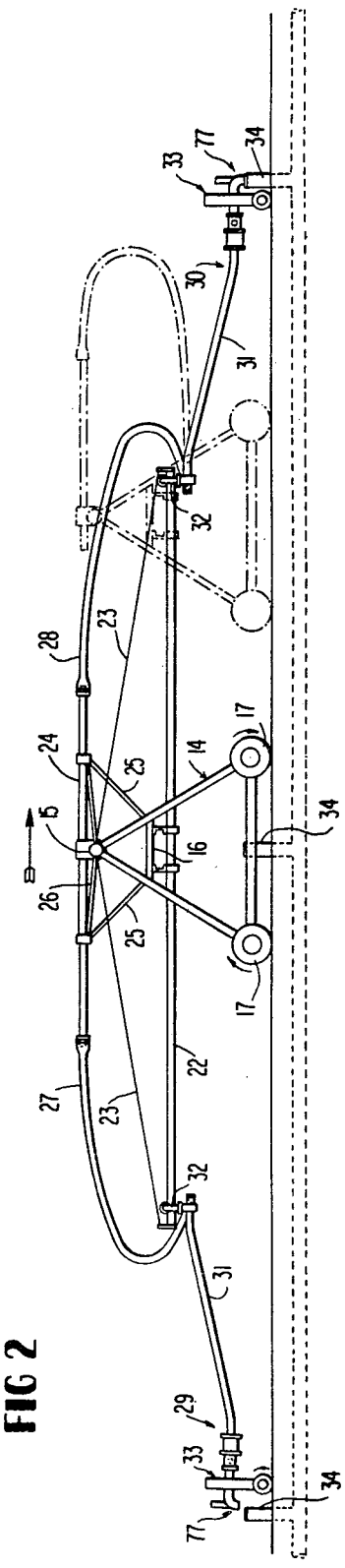
FIG. 2 is a side elevation view of the apparatus shown in FIG. 1, with a portion of the apparatus shown in broken line in an alternate position.

Referring first to FIGS. 1 and 2 of the drawings, one end portion of a water sprinkler line is designated generally by the reference numeral 10 and is shown supported by a truss structure 11 having one end mounted at the top of a driven, wheeled conveyance mechanism, or tractor, designated generally by the reference numeral 12. The tractor 12 has an open frame structure including a pair of laterally spaced A-frame assemblies 13, 14 rigidly joined at their top by an elongated water pipe or manifold 15 and at a point spaced below the manifold 15 by a structural platform 16. Wheels 17, located one at each corner of the assembly, support the tractor for movement over the ground. Each wheel 17 is driven by a separate motor means 18, and means are provided to synchronize the respective drive motors to control movement of the tractor along the length dimension of a fixed water main indicated by the broken lines at 19. Suitable bracing members 20 provide rigidity and structural integrity to the tractor assembly. A suitable coupling 21 is provided between the sprinkler line 10 and the manifold 15 to permit limited pivotal or steering movement between the tractor and the sprinkling line 10. Although a single sprinkling line 10 is illustrated, it is understood that a second sprinkling line may be connected to the opposite side of the tractor assembly if desired.

An elongated support rail, or track 22 is rigidly mounted, at its central portion, on the horizontal platform 16 at a point substantially midway between the A-frames 13, 14. Track 22 is generally horizontal and extends fore and aft of the tractor in a line substantially parallel to the water main 19. The track may be made of any suitable material such as a length of heavy wall pipe, a rolled structural shape, or the like, and suitable cable or other bracing 23 extending between the ends of the track and the manifold 15 is provided to carry a portion of the weight and stabilize the track against undue flexing or bending.

An elongated pipe 24 is mounted on manifold 15 and extends in parallel relation to the track 22 at one side of the tractor 12. Pipe 22 has its midsection connection to the manifold 15 to provide a waterflow path from either end of the pipe into the manifold. Suitable braces 25, 26 provide vertical and lateral support for the projecting end portions of the pipe 24. As is best seen in FIG. 2, the pipe 24 has a length substantially less than track 22 and preferably slightly less than one half the length of track 22. A pair of elongated flexible hoses 27, 28 are connected one to each end of the pipe 24, with the other ends of the hoses 27, 28 being connected one to each of a pair of identical connector pipe assemblies 29, 30, only one of which will be described in detail, it being understood that the description applies equally to each of the connector pipe assemblies.

The connector pipe assemblies each include an elongated water pipe 31 having one end supported for free rolling movement along track 22 by a roller carriage, or trolley 32 and its other end supported by a wheeled carriage assembly 33 for movement into position to be connected to spaced risers or hydrants 34 on and projecting upwardly from the water main 19 through outlet valves 35 mounted in the top of each of the hydrants.

The inner end of elongated water pipe 31, i.e., the end supported on track 22, is closed by a cap 36, and the short length of pipe 37 is rigidly welded on and communicates with pipe 31 adjacent its end. The short length of pipe 37 on connector assembly 29 is connected to and supports the end of the flexible hose 27, with suitable clamps 38 releasably securing the flexible hose 27 on the pipe fitting 37, and hose 28 is similarly connected to the connector assembly 30. The trolleys 32 are rigidly connected to the pipes 31 adjacent the pipe fittings 37. Each trolley includes a yoke having a pair of laterally spaced side plates 39, 40 joined at their bottom end to the pipe 31 by a weld block 41. A concave roller 42 is supported between plates 39, 40 adjacent their top end, by a suitable axle member 43. The track 22 which, in the illustrated embodiment is in the form of a length of pipe, extends between the weld block 41 and the roller 42 to support the inner end of pipe 31 for free rolling movement along the length of the track 22 between the end plate 44 rigidly welded on track 22 and the structural members of the rigid transverse platform 16 which supports the central portion of the track. The radius of curvature of roller 22, in the plane containing the axis of the roller, is slightly greater than the radius of the track 22 to permit limited twisting movement of the yoke resulting from slight lateral displacement of the carriage supported end of the pipe 31 from the vertical plane of track 22. Similarly, the weld block 41 and the top of pipe 31 is spaced below the bottom of track 22 a distance to permit limited movement of the pipe 31 about the axis of roller 42.

Referring again to FIGS. 1 and 2, it is seen that the overall length of the assembly, including the track 22 and the two connector assemblies 29, 30, is sufficient to span three hydrants 34 on water main 19 when the connector assemblies are extended to a point adjacent the end of the track 22. In this position, the connector assembly 29 may be connected to a first hydrant, the tractor positioned directly above the next hydrant along the water main and the connector assembly 30 connected to the third successive hydrant 34. When the connector assembly 29 is disconnected from the first hydrant, the tractor can proceed to the phantom line position shown in FIG. 2, at which point the trolley supporting the water pipe 31 of connector assembly 30 will have rolled along track 22 to a position adjacent the central platform 16. During this time, connector assembly 29 can be driven forward at a rate greater than the rate of movement of the tractor, with the trolley rolling freely along track 22 independent of movement of the tractor, to position the connector assembly 29 for connection to the second hydrant 34. Thereafter, connector assembly 30 can be disconnected from the third hydrant 34, in the manner described more fully hereinbelow, and advanced with tractor 12 along the length dimension of water main 19 to position connector assembly 30 for connection to the fourth, or next successive hydrant. This procedure can be repeated to progressively walk the apparatus through a field, in either direction, with the tractor being driven at a substantially constant rate corresponding to the rate of movement of the sprinkler line.

Referring now to FIGS. 6-10, the carriages 33 supporting the outer ends of the connector pipe assemblies each has a frame in the general configuration of an inverted U including a cross member 45 and opposed, substantially vertical, laterally spaced legs 46, 47. A bearing sleeve 48 rigidly welded on the lower end of leg 46 pivotally supports a yoke 49 which mounts a ground engaging wheel 50. A similar bearing sleeve 51 rigidly mounted on the bottom of leg 47 pivotally supports a yoke 52 mounting a second ground engaging wheel 53. Motors 54, 55 are connected to and drive wheels 50, 53, respectively to propel the carriage 33 over the ground.

As best seen in FIG. 10, a hydraulic cylinder assembly 56 is connected between a rigid bracket 57 on leg 46 and an outwardly extending arm 58 on yoke 49 to steer the wheel 50. Similarly, a second hydraulic cylinder 59 is connected between a rigid bracket 60 on leg 47 and an arm 61 on yoke 52 to steer the wheel 53. Steering control of the carriage may be effected by any suitable means illustrated in FIGS. 1 and 7 as including a guide line 62 in the form of an electrical conductor buried in the ground in fixed parallel spaced relation to the water main 19 and a suitable electrostatic pickup device 63 carried on a laterally extending arm supported on the leg 46 of the carriage 33. It should be understood that various guiding systems are known in the art and may be used. For example, as a cable or wire stretched above the ground in fixed relation to the water main may be used with suitable means such as a contact follower or metal sensor to sense the position of the wire and thereby control actuation of the steering mechanism to guide the carriage accurately along a fixed path between successive hydrants 34. Similar guide means can be provided for the tractor 12.

In order to provide for limited movement of the outer end water pipe 31 with respect to the carriage 33, the pipe 31 is illustrated as being rigidly welded to a slider block 64 mounted for horizontal sliding movement between upper and lower guide rails 65, 66, respectively of a rectangular open frame having opposed vertically extending side members 67, 68, mounted for vertical sliding movement in elongated slots 69, 70 in legs 46, 47 respectively. A hydraulic ram has its cylinder 71 connected to the bottom surface of cross frame member 45 and its piston 72 pivotally connected, as by pin 73 and bracket 74, to the top guide rail 65 to vertically move the rectangular frame and slider block, and the outer end of water pipe 31 supported therein, relative to the frame of carriage 33. Slider block 64 can be permitted to slide freely between the guide rails 65, 66 or, if desired, the slider blocks may be biassed by suitable means such as springs, not shown, to normally remain centrally located between the opposed vertical legs 46, 47. The vertical side members 67, 68 are preferably assembled onto the end portions of guide rails 65, 66 by threaded fasteners, or bolts, 75 to permit easy assembly and disassembly of the structure.

A water flow control valve 76 is mounted in water pipe 31 adjacent the outer end thereof. Valve 76 is only schematically illustrated and can be an electrically actuated solenoid valve or other suitable valve means operable to prevent back flow of water through the pipe 31 when the pipe is disconnected from a hydrant.

The outer end of pipe 31 terminates in a coupling assembly 77 for coupling the pipe 31 in water flow relation with an outlet valve assembly 35, described hereinbelow, in the top portion of the hydrants 34 as the carriage 33 approaches a hydrant. The coupling assembly 77 projects forwardly from the carriage 33 so that, as the carriage approaches a hydrant 34 the coupling can be guided into accurate alignment with the hydrant by guide means mounted on the enlarged housing 191 of coupling assembly 77, with the guide means projecting below the coupling assembly in position for engaging the outer casing of the hydrant. The guide assembly includes a pair of arms 78, 79 rigidly mounted on and extending outwardly and downwardly from the enlarged housing 191, with one arm being located on each side of the housing. The two arms, and the guide assembly supported thereon are identical, each including a pair of spaced plate members 80, 81 joined at their bottom end by a rigidly welded horizontal plate member 82. A rotary actuator, for example a rotary hydraulic actuator 83, is mounted on each of the plates 82 and supports a generally crescent shaped guide arm 84 for limited movement about the vertical axis of the actuator 83.

Referring now to FIGS. 9 and 10, as the coupling member 77 approaches hydrant 34, actuators 83 swing the arms 84 about their vertical rotational axis so that the forwardly projecting ends of the arms are spaced apart a distance substantially greater than the outer diameter of a hydrant 34 and their trailing ends are spaced apart a distance substantially less than the diameter of the hydrant, with the two arms 84 cooperating to form a generally V-shaped guide. In the event that the coupling member is perfectly aligned with hydrant 34, the rearwardly projecting ends of the arms 84 will contact the outer surface of the hydrant 34 at exactly the same time, and sensors 85, for example microswitches, mounted on the rearwardly projecting ends of the arms 84 are actuated when the coupling member is advanced along the water main as far as permitted by the engagement of the arms with the hydrant. Actuation of the two sensors 85, which are located equally distant from the vertical axis of the rotary actuators 83, signals alignment of the coupling member 77 with the hydrant and stops the drive motors 54, 55 with the coupling member directly above the hydrant in position to be connected in water flow relation with the hydrant.

In the event that the coupling member 77 is slightly misaligned, i.e., positioned to one side or the other of the center of the hydrant, the arm 84 on the opposite side will engage the hydrant first and act as a cam to move the slider block 64 along guide rails 65, 66 as necessary to bring the coupling member into perfect alignment with the hydrant. As soon as the coupling member is in alignment with a hydrant, the carraige 33 is stopped and the coupling member is actuated in the manner described hereinbelow to automatically connect the coupling member with the outlet valve 35 in the hydrant to admit water into the pipe 31.

Upon disconnecting the coupling member from a hydrant, the actuators 83 are rotated to turn the arms 84 about their vertical support axis to move the rearwardly projecting ends of the arms apart and permit the connector assembly to move past the hydrant. After a predetermined time the rotary actuators again rotate the arms to their original position to engage and guide the coupling member into position to be coupled to a hydrant as indicated in the successive broken line position of the arms in FIG. 9. Upon reversal of the apparatus to move the irrigation assembly in the opposite direction through a field, the position of the actuator and arms are reversed as indicated in FIG. 10. Thus, a second pair of sensors 85, not shown, are mounted on the opposite ends of the arms.

Referring now to FIGS. 6, 8, and 14A through 14D, the details of the coupling assembly at the end of the water carrying pipe 31, and the special outlet valve 35 on the hydrants 34 will be described in detail. At the outset, it is noted that the water flow valve 76 remains closed at all times when the pipe 31 is not in water flow relationship with an associated outlet valve 35 in a hydrant 34. Also, a solenoid actuated bleeder valve 86 (FIG. 6) is open when valve 76 is closed to bleed water from the coupling assembly and the end portion of pipe 31 to relieve pressure in this structure prior to uncoupling the coupling assembly from a hydrant.

The individual riser, or hydrant 34 may be of any suitable construction, but preferably includes a double wall to protect against possible damage of the valve structure supported therein by impact with the connector assembly guide structure. Thus, the respective hydrants may include an internal pipe 173 surrounded by an external pipe 174, with the space between being filled as with concrete 175. The outlet valve 35 is mounted in the open top end of the riser pipe 173, and an overhanging reinforcing plate 176 attached to the upper end of the casing centers the valve 35 and provides a horizontal flange 177 extending around and projecting outwardly from the periphery of the outer casing 174.

Water outlet valve 35 further comprises an enlarged housing 180 enveloping the valve structure proper, the latter consisting of a supporting spider 181 which slidably receives a valve stem 182 carrying the valve closure disc 183, spring pressed by coil spring 184 into seating engagement with valve seat 185. A cylindrical portion 186 of the valve housing 180 extends upwardly into sealing engagement with plate 176. A groove and an internally positioned O-ring indicated at 187 are located at an intermediate point in the height of the cylindrical portion 186.

The coupling members 77 each have an enlarged housing 191 which includes a cylindrical downwardly extending portion 192 housing a reciprocating telescopingly received cylindrical water conducting member 193, cylindrical portion 192 having a groove and an internally positioned O-ring 194 at an intermediate point in the height of cylindrical portion 192. The O-ring seals the space between cylindrical portion 192 and cylindrical water conducting member 193 while permitting reciprocating movement of water conducting member 193. A spider 195 carried by the uppermost portion of the water conducting member 193 slidably receives a rod-like valve actuating member 197 while permitting water to pass through housing 191 to valve 76 and water carrying pipe 31. Housing 191 has projecting through its wall a packing gland 199 which permits valve actuating member 197 to extend out of the casing while permitting water sealed reciprocating movement thereof through the housing wall. A collar 201 fixedly secured to valve operating member 197 supports cylindrical water conducting member 193 with cylindrical water conducting member 193 being slidably on valve actuating rod 197. A second collar 202 is fixedly secured on valve actuating rod 197 above spider 195 of water conducting member 193. The uppermost portion of valve actuating rod 197 is integral with the lower end of a piston rod 196 which enters into and is joined to a piston in a hydraulic cylinder 204. A bracket 205 is fixedly secured to the lower end of cylinder 204, bracket 205 having ears 206, 206 at its outer ends for pivotally supporting a pair of depending arms 207, 207 on pins 208, 208. At their lowermost ends depending arms 207 carry inwardly projecting fingers 209, 209 designed to engage under flange 177. On the depending cylindrical portion 192 of housing 191 a bracket is fixedly secured having outwardly extending bifurcated arms 211, 211 forming slots through which depending arms 207 slidably pass. At the outer end portions of such slots are pins 212, 212 and on the innermost portion of such slots are two additional pins 213, 213. Pins 212 and 213 cooperate with camming surfaces on opposite sides of a pair of identical camming members 215, 215, one set of camming surfaces being indicated at 216, 216 and the other set of camming surfaces being indicated at 217, 217.

Surrounding valve piston rod 196 where it enters cylinder 204 and disposed between the lowermost end of cylinder 204 and the upper surface of packing gland 199 is a strong coil spring 220 which can be held in its compressed state when the piston rod end 196 of valve actuating rod 197 is in fully retracted position in cylinder 204.

Figures 7, 8:
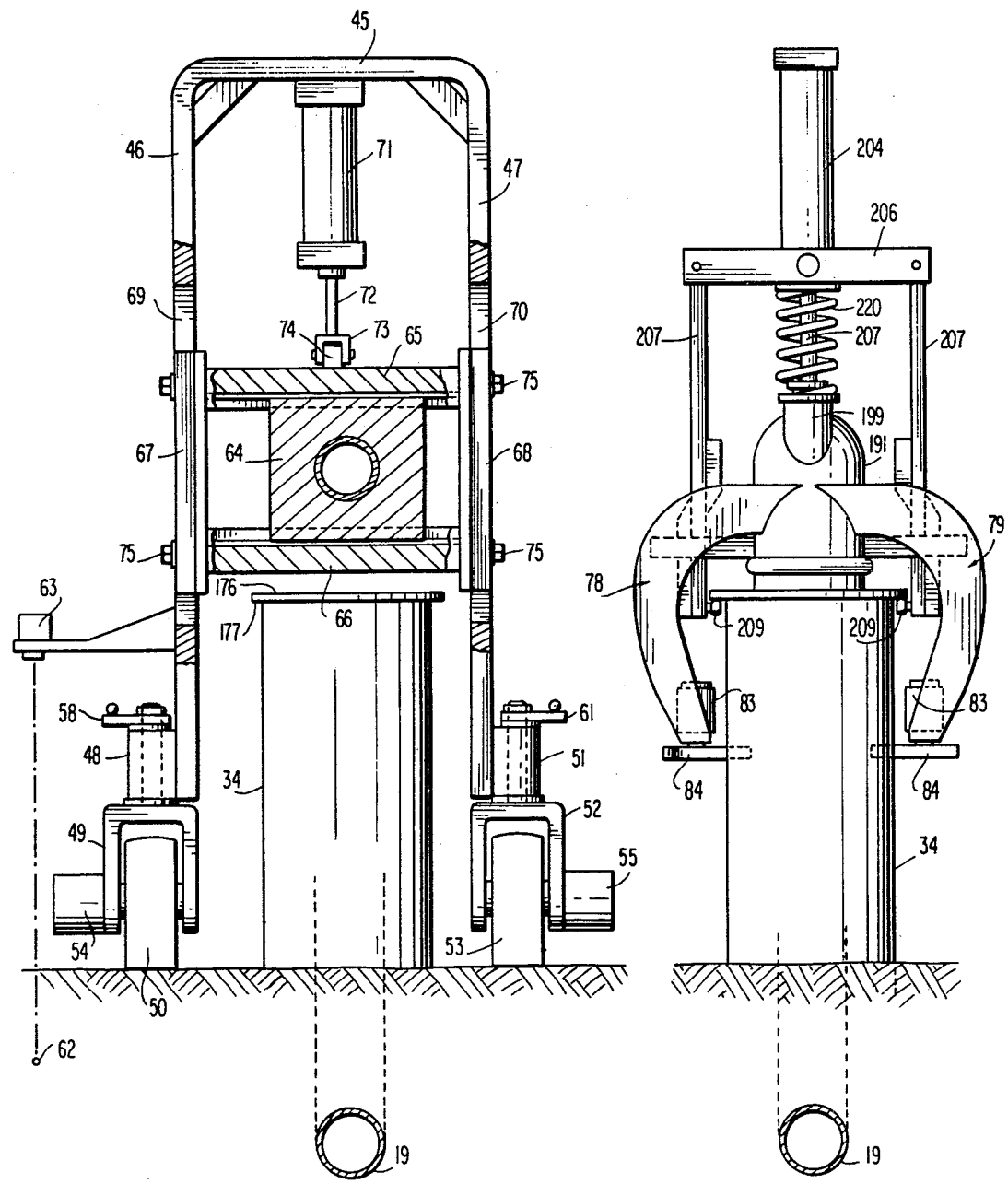
FIG. 7 is a fragmentary sectional view taken on line 7—7 of FIG. 6.
FIG. 8 is an end elevation view of the structure shown in FIG. 6.

FIG. 8 shows the coupling member, indicated generally at 77, in coupled position with the casing 174 of a hydrant. FIGS. 14A, 14B, 14C, and 14D demonstrate how the components of coupling member 77 make the connection with riser casing 174, seal off the joint between the coupling member and the outlet valve 35, and open the valve. Referring now to FIG. 14A, and assuming our coupling member as already being connected to an outlet valve 35 as the second coupling member 77 approaches a hydrant 34 and is guided into vertical alignment with outlet valve 35 by arms 84, fingers 209 are held in such spaced relation from each other that they will clear flange 177. Additionally, the distance between fingers 209 and the lowermost edge of cylindrical coupling element 192 is appreciable and allows tolerance, if needed, relative to the height of coupling member 77 above the outlet valve while still properly positioning the parts for connection. Thus, coupling member 77 can approach hydrant 34 at a considerable height so long as locator or guide arms 84 can make contact with casing 174 of the hydrant below the flange 177. Cylinder 71 normally maintains the housing 191 at a height such that it clears the top of the hydrant 34 with a substantial margin of safety, then lowers the coupling member 77 to seat the bottom open end of cylindrical portion 192 on the hydrant when the sensors 85 signal that the coupling member is centered over the hydrant.

Starting with the operating parts of coupling member 77 and outlet valve 35 as shown in FIG. 14A, the hydraulic fluid on the lower side of the piston in cylinder 204 has its pressure reduced permitting coil spring 220 to push cylinder 204 and framework 205, 207 upward relative to arms 211. Upon such movement, cam surfaces 216, 216 move rollers 209 inwardly and as cylinder 204 and the depending framework continue to move upwardly, fingers 209 engage flange 177. Coil spring 220 is strong enough, acting through the depending framework and fingers 209 under flange 177 to hold the coupling member and outlet valve 35 in registry ready for water-tight coupling and subsequent valve opening actions, as shown in FIG. 14B.

Considering next the transition from FIG. 14B to FIG. 14C, with the coupling member in the position shown in FIG. 14B, the hydraulic fluid pressure in cylinder 204 is increased on the upper side of the piston to extend piston rod 196 downwardly to cause collar 202 to engage spider 195 and thereby move cylindrical water conduit member 193 downwardly into the cylindrical portion 186 of outlet valve housing 180, the chamfered lower edge of cylindrical water conduit 193 assuring registry and a telescoping relationship of that part within the cylindrical portion 186 of outlet valve housing 180.

As shown in FIG. 14D, continued movement of piston rod 196 and valve actuating rod 197 carries cylindrical water conduit member 193 further down and into sealing engagement with O-ring 187 thereby completing the sealed water flow passage between the outlet valve housing 180 and the water carrying arm, permitting water to flow through this passage as the completion of the movement of valve operationg rod 197 pushes valve plate 183 open against the pressure of spring 184.

Since a short interval of time can elapse from the time guide arms 84 bring coupling member 77 into contiguity with an outlet valve 35 until the coupling member is lowered and clamped in position, a time-delay mechanism, not shown, can be included to delay valve opening operation of the valve operating rod 197 if desired.

A water pressure sensitive control (not shown) in housing 191, in association with electronic controls carried on the tractor 12, closes bleeder valve 86 and opens solenoid water flow control valve 76.

Turning now to the first coupling member 77 which was previously connected in water flow relation to a water outlet valve 35 at the time locator arms 84 lines up the second coupling member 77 with the outlet valve 35 as just described, the delay signal already mentioned delays the disconnect sequence of actions in the first coupling member 77 until valve 183 as just described has opened to place its associated water carrying pipe 31 in water flow relation with the main line. This delay is advisable so that at least one water carrying pipe is continuously in water flow connection with the water main 19. Movement of the tractor 12 need not be interrupted while these operations take place, however, since the length of the track 22 and of the pipe 24 and hoses 27, 28 are such as to permit limited movement of the tractor while connector members are connected to a hydrant. Thus an appreciable time lag in making the connection and valve opening at one outlet valve (for example a minute) and breaking the connection at the other will have no objectionable effect, and these connection and disconnection actions need not necessarily be simultaneous but only approximately so.

Before breaking the first coupling member connection, a suitable control now shown but per se known acts in conjunction with the initiation of disconnection of the outlet valve 35 and the first coupling member 77 to close the solenoid valve 76 adjacent to that first coupling member and to open corresponding bleeder valve 86 to reduce pressure in the coupling member prior to actual disconnection. The bleeding action is advisable to gradually relieve the water pressure differential across the valve elements and to relieve pressure on the gaskets or seals.

All the coupling members and outlet valve members being identical, the showing in FIGS. 14D, 14C, 14B, and 14A in that order illustrate the sequence of actions in breaking the connection between a coupling member 77 and the associated outlet valve 35. Considering FIG. 14A it will be noted that increasing the pressure on the lower side of the piston in hydraulic cylinder 204 will compress spring 220, at the same time pulling up arms 207 and causing cam surfaces 217, 217 to spread arms 207 and disengage fingers 209 from the undersurface of flange 177, permitting coupling 77 to move away from the outlet valve 35.

As tractor 12 moves down the field, its respective wheels 17 will at times encounter different ground levels which will cause track 22 to depart from a horizontal position longitudinally. However, since the trolleys supporting the inner ends of pipes 31 permit both limited vertical and horizontal pivotal movement between the track 22 and the pipes 31, such departure from the horizontal by the tractor does not adversely effect operation of the apparatus. Since the carriages 33 are located very close to the coupling members 77, substantial movement of the inner ends of pipes 31 produces only minor movement of the connectors so that the aligning arms 84, in combination with the elevating cylinder 71 readily align the coupling members 77 with the valves 35.

Since the trolley 32 is supported by wheel 42 to roll freely on track 22, little or no force is required to maintain a connector assembly stationary as the tractor moves along the water main 19 with the sprinkler line. Thus, once a coupling member 77 is connected to an outlet valve and hydrant assembly, this connection will maintain the associated connector assembly stationary until the coupling member is disconnected in sequence. At that time, suitable controls carried by the tractor 12 energize the drive motors 54, 55 in a direction to drive the carriage and the associated connector assembly forward along the water main at a rate which is at least substantially twice the rate of the tractor to move the associated trolley 32 along track 22 between the end plate 44 and the central platform 16 and to position the associated coupling member 77 adjacent the next successive hydrant 34 while the tractor moves along the water main 19 about one half the distance between successive hydrants. Thus, referring to FIG. 2, with the tractor positioned at one hydrant, the connector assembly 30 connected to the next hydrant forward of the tractor, and the connector assembly 29 having just been disconnected from the next hydrant behind the tractor, the carriage 33 on the connector assembly 29 must be driven at a rate to position its coupling member 77 over the next succeeding hydrant by the time the tractor has reached a point, illustrated in broken line, approximately halfway to the next succeeding hydrant. In this position, the trolley 32 of connector assembly 29 will be positioned substantially adjacent the horizontal platform 16 so that the tractor can continue its movement to the next succeeding hydrant without further movement of the connector assembly 29. During this continued movement of the tractor, the connector assembly 30 is disconnected from its hydrant to position its associated coupling member 72 above the next succeeding hydrant, at the same time rolling its trolley 32 along the track 22 from the position adjacent the central platform 16 to a position adjacent the end plate 44.

In practice, the hydrants 34 may be 50 feet apart along the length of the water main 19, with the total overall length of the track 22 being at least 50 feet and prefereably approximately 55 feet. In such an arrangement, the pipe 24 connected to the manifold 15 may be spaced above track 22 by about 6 feet and have a total length of about 22 feet, with the length of the flexible hoses 27, 28 each being approximately 21 feet. With an overall length of the connector assemblies 29, 30, between the associated coupling members and the trolley being approximately 25 feet, the apparatus has a capability of extending to a total length slightly in excess of 100 feet, thereby providing an adequate margin of safety to permit continued movement of the tractor for a limited time while both coupling members are connected to a hydrant so that precisely simultaneous coupling and uncoupling is not required as described above.

Referring now to FIGS. 11-13, an alternate embodiment of the invention is illustrated in which the track carried by tractor 12 has been substantially shortened and the rigid pipe extending parallel to the track on the manifold 15 has been eliminated. Since the method of operation of this embodiment is substantially identical to that described above, and most of the components the same or similar, only the differences between the two embodiments will be described herein, with like reference numerals being employed to illustrate like parts in the two embodiments. Thus, the sprinkler line 10 is again connected, through coupling means 21, to the manifold 15 carried on the tractor 12. The A-frames 13, 14 are connected by cross beams 90, 91, in addition to the manifold 15, and a pair of substantially identical, laterally spaced track assemblies 92, 93 are suspended beneath the beams 90, 91.

As seen in FIG. 12, the track assembly 92 consists of a first structural beam 94 rigidly joined at its central portion to the bottom surface of cross beams 90, 91 and extending outwardly therefrom in a direction generally parallel to the direction of movement of the tractor. End plates 95, 96 project downwardly from the ends of beam 94 and support the opposed ends of an elongated track 97 which extends beneath and parallel to the beam 94. The trolley wheel 42 on the end of the elongated water pipe 31 of the forwardly extending connector assembly 30 rolls on the track 97 as in the previously described embodiment. In this embodiment, however, the pipe 31 is required to be somewhat longer in view of the fact that the track 97 is centered beneath the manifold 15 so that the trolley wheel 42 rolls from extreme positions which are equally spaced from the transverse center line of the tractor. The flexible hose 28, which is connected directly to the end of the pipe 31 can be of the same length as in the previous embodiment, with the stationary end of the hose 28 being connected directly to the manifold 15 through a suitable pipe fitting.

As shown in FIG. 13, track assembly 93 is a mirror image of the track assembly 92, consisting of a top support beam 98 rigidly joined on and projecting outwardly from the cross beams 90, 91, with downwardly extending end plates 99, 100 supporting a track 101 in parallel downwardly spaced relation to the support beam 98. Trolley wheel 42 supported on the inner end of pipe 31 of the connector assembly 29 rolls along track 101 in the manner described above. The lateral spacing of track assemblies 92, 93 is easily accommodated by the trolley wheel so that alignment of the coupling members and operation of the apparatus is identical to that described above. One advantage, however, of this embodiment is that a greater portion of the weight of the water between the manifold and the coupling members is carried by the wheeled carriages and the shorter track assemblies may require less bracing to carry the load. Also, the elongated fixed pipe connected to the manifold 15 is eliminated to simplify the design.

In order to simplify the description of the invention, certain state-of-the-art devices have not been shown or described. For example, it is contemplated that an internal combustion engine will be provided on the tractor for driving suitable generator and hydraulic pump means to provide power for the various components. Similarly, state-of-the-art controls such as microswitches, time delay relays, or microprocessors have not been illustrated since such devices are well-known. Thus, while I have disclosed and described preferred embodiments of my invention, I wish it understood that I to not intend to be restricted solely thereto, but rather that I do intend to include all embodiments thereof which would be apparent to one skilled in the art and which come within the spirit and scope of my invention.

I claim:

1. For use in connection with a land irrigation system including an elongated main having a plurality of outlet valves located in hydrants projecting upwardly from the main at points along its length and an elongated sprinkler line extending laterally to and movable along the main, an apparatus for successively connecting the outlet valves to the sprinkler line comprising:

a tractor movable along the main at a rate substantially equal to the rate of movement of the sprinkler line;

an elongated track mounted on the tractor and extending outwardly therefrom in the general direction of movement of the tractor;

a pair of elongated fluid conduits, each having an inner end;

first and second fluid couplers, including means for connecting the respective fluid couplers to an outlet valve to receive fluid under pressure and for disconnecting the fluid couplers from the outlet valve;

means coupling the respective fluid conduits with the sprinkler line to provide a fluid flow path therebetween;

support means supportably coupling the fluid conduits near their inner ends to the track, thereby to allow relative longitudinal movement of said inner ends in a substantially horizontal plane, the respective fluid conduits extending outwardly from the tractor in generally opposite directions generally parallel to the direction of movement of the tractor and each having an outer end portion in communication with the respective fluid couplers;

first and second carriages, including ground engaging wheels on each, rigidly coupled to said fluid conduits and for supporting a respective fluid coupler; and wheel driving means supported on the respective carriages for alternately moving each carriage longitudinally of the fluid main thereby to successively engage the fluid couplers and the outlet valves.

2. In the operation of a land irrigation system including an elongated water main having a plurality of outlet valves located in hydrants projecting from the water main at spaced points along its length and an elongated water sprinkling line extending laterally to and movable along the water main, a method of supplying water under pressure from the water main to the sprinkler line comprising:

propelling a tractor in a direction along the water main at a rate substantially equal to the rate of movement of the sprinkler line;

supporting the inner ends of each of a pair of elongated water conduits to allow relative movement of said inner ends in a substantially horizontal plane in a direction generally along the water main and to allow relative movement between the respective water conduits in the direction of the water main, with the water conduits extending outwardly in generally opposite directions along the water main;

supporting the outer end of each of the water conduits in association with a pair of driven wheeled carriages;

providing an outlet valve coupling mechanism on the respective carriages and in association with the outer end of each water conduit for establishing water flow connection with the outlet valves in the hydrants on the water main;

driving the wheels of each wheeled carriage to move the water conduit longitudinally of the water main to successively engage the outlet valve coupling mechanism with the respective outlet valve along the length of the water main, the step of driving the wheeled carriages including driving such wheeled carriages alternately of one another during the propelling of the tractor;

coupling the inner ends of the water conduits to the sprinkler line to provide a water flow path therebetween; and successively connecting and disconnecting the respective outlet valve coupling mechanisms with the outlet valves along the length of the water main and continuously maintaining at least one of the outlet valve coupling mechanisms connected to an outlet valve to supply water under pressure to the water conduit associated therewith.

3. For use in connection with a land irrigation system including an elongated main line having a plurality of outlet valves located in hydrants projecting upwardly from the main line at spaced points along its length and an elongated fluid sprinkler line extending laterally to and movable along the main line, an apparatus for successively connecting the outlet valves to the sprinkler line comprising:
- a tractor movable in a direction along said main line at a rate substantially equal to the rate of movement of the sprinkler line;
- first and second motor driven carriages movable along the main line between successive outlet valves, each carriage including a fluid coupler for coupling to the respective outlet valve and receiving irrigation fluid therefrom;
- first and second pipe assemblies movably coupled between the respective fluid couplers of said carriages and said spinkler line, each of said pipe assemblies including at least one elongated fluid conduit extending in the direction of the main line and having one end coupled to the respective fluid couplers, each of said pipe assemblies including support structure for supporting the respective other ends of the elongated fluid conduit for movement in a generally horizontal plane and to allow relative longitudinal movement therebetween in the general direction of the movement of the motor driven carriages; and
- drive means, including motor means supported on the respective carriages for driving the wheels thereof, for alternatively moving said carriages between outlet valves to effect said coupling, said drive means configured to move one of the carriages when the other carriage is receiving fluid at an outlet valve, thereby to provide continuous fluid communication between the main line and the sprinkler line.

4. The method of operating a land irrigation system which includes an elongated main line having a plurality of outlet valves located in hydrants projecting from the main line at spaced points along its length and having an elongated sprinkling line extending laterally to and movable along the main line, and having a tractor at one end of the sprinkling line for moving the end of the sprinkling line relative to the main line, comprising the steps of:
(a) moving the tractor in a direction along the main line at a rate substantially equal to the rate of movement of the sprinker line;
(b) supporting on a first carriage having motor driven wheels, a first pipe assembly in fluid communication between the sprinkling line and a first hydrant;
(c) supporting on a second carriage having motor driven wheels, a second pipe assembly in fluid communication between the sprinkling line and another hydrant;
(d) supporting the first and second pipe assemblies at a respective point thereon intermediate the sprinkler line and the carriage to allow movement of said points in a generally horizontal plane and to allow relative movement between said points and said tractor;
(e) passing fluid from at least one of the hydrants into the sprinkling line;
(f) while passing fluid from one of the hydrants into the sprinkling line, the steps of decoupling the other pipe assembly from the other hydrant and driving the wheels of said other carriage to move said other carriage to another hydrant to begin passage of fluid from the other hydrant into the sprinkling line;
(g) moving the sprinkler line during the passing of the fluid from the hydrant to the sprinkler line, thereby providing continuous fluid communication to the sprinkler line while it is moving.

5. For use in connection with a land irrigation system including an elongated main having a plurality of outlet valves located in hydrants projecting upwardly from the main at points along its length and an elongated sprinkler line extending laterally to and movable along the main, an apparatus for successively connecting the outlet valves to the sprinkler line comprising:
- a tractor movable in a direction along the main at a rate substantially equal to the rate of movement of the sprinker line;
- an elongated track mounted on the tractor and extending in the direction of movement of the tractor;
- a pair of elongated fluid conduits, each having an inner end;
- first and second fluid couplers, including means for connecting the respective fluid couplers to an outlet valve to receive fluid under pressure and for disconnecting the fluid couplers from the outlet valve;
- means coupling the respective fluid conduits with the sprinkler line to provide a fluid flow path therebetween;
- support means mounting the inner ends of the fluid conduits on the track for relative longitudinal movement therebetween in a generally horizontal plane, the respective fluid conduits extending outwardly from the tractor in generally opposite directions generally parallel to the direction of movement of the tractor and each having an outer end portion in communication with the respective fluid couplers;
- first and second carriages, including ground engaging wheels on each, rigidly coupled to said support means and for supporting a respective fluid coupler, said elongated track mounted on said tractor at an elevation above said carriages; and
- carriage wheel drive means carried by said carriages for alternately moving each carriage and the fluid conduit associated therewith longitudinally of the track and of the fluid main to thereby successively engage the fluid couplers and the outlet valves.

6. The apparatus according to claim 5 wherein said inner ends comprise pipe and wherein said inner pipe ends are supportably coupled to said track.

7. For use in connection with a land irrigation system including an elongated main having a plurality of outlet valves located in hydrants projecting upwardly from the main at points along its length and an elongated sprinkler line extending laterally to and movable along the main, an apparatus for successively connecting the outlet valves to the sprinkler line comprising:
- a tractor movable along the main at a rate substantially equal to the rate of movement of the sprinkler line;
- an elongated track mounted on the tractor and extending outwardly from the tractor;
- a pair of elongated fluid conduits, each having an inner end;
- first and second fluid couplers, including means for connecting the respective fluid couplers to an outlet valve to receive fluid under pressure and for disconnecting the fluid couplers from the outlet valve;

means coupling the respective fluid conduits with the sprinkler line to provide a fluid flow path therebetween;

support means supportably coupling the fluid conduits near their inner ends to the track for allowing relative longitudinal movement therebetween in a generally horizontal plane, the respective fluid conduits extending in a direction away from the tractor and each having an outer end portion in communication with the respective fluid couplers;

first and second carriages, including ground engaging wheels on each, supportably coupled to the respective fluid conduits for supporting a respective fluid coupler; and carriage wheel drive means carried by the carriages for alternately moving each carriage longitudinally of the fluid main thereby to successively engage the fluid couplers and the outlet valves.

8. For use in connection with a land irrigation system including an elongated main line having a plurality of outlet valves located in hydrants projecting upwardly from the main line at spaced points along its length and an elongated fluid sprinkler line extending laterally to and movable along the main line, an apparatus for successively connecting the outlet valves to the sprinkler line comprising:

a tractor movable in the direction of said main line at a rate substantially equal to the rate of movement of the sprinkler line;

first and second wheeled support structures movable along the main line between successive outlet valves, each wheeled support structure including a fluid coupler for coupling to the respective outlet valve and receiving irrigation fluid therefrom, each wheeled support structure having ground engaging wheels;

first and second pipe assemblies movably coupled respectively between said wheeled support structures and and sprinkler line, said pipe assemblies each including:

(i) an elongated fluid pipe in fluid communication with said fluid coupler and said sprinkler line, one end of said fluid pipe supported on said wheeled support structure and the other end of said fluid pipe extending from the wheeled supported structure in the direction of the main line; and (ii) means movably supporting said other end of the fluid pipe for movement in a generally horizontal plane in the direction of the main line to allow relative longitudinal movement between said other ends thereby to allow relative movement between the respective wheeled support structures and said sprinkler line while maintaining said fluid communication; and wheel drive means carried by the wheeled support structures for moving said wheeled support structures between the outlet valves to effect said coupling of the fluid coupler to the respective outlet valves.

* * * * *